J. H. WICKSTROM.
HOG FOUNTAIN.
APPLICATION FILED JAN. 21, 1919.
1,317,148.
Patented Sept. 23, 1919.
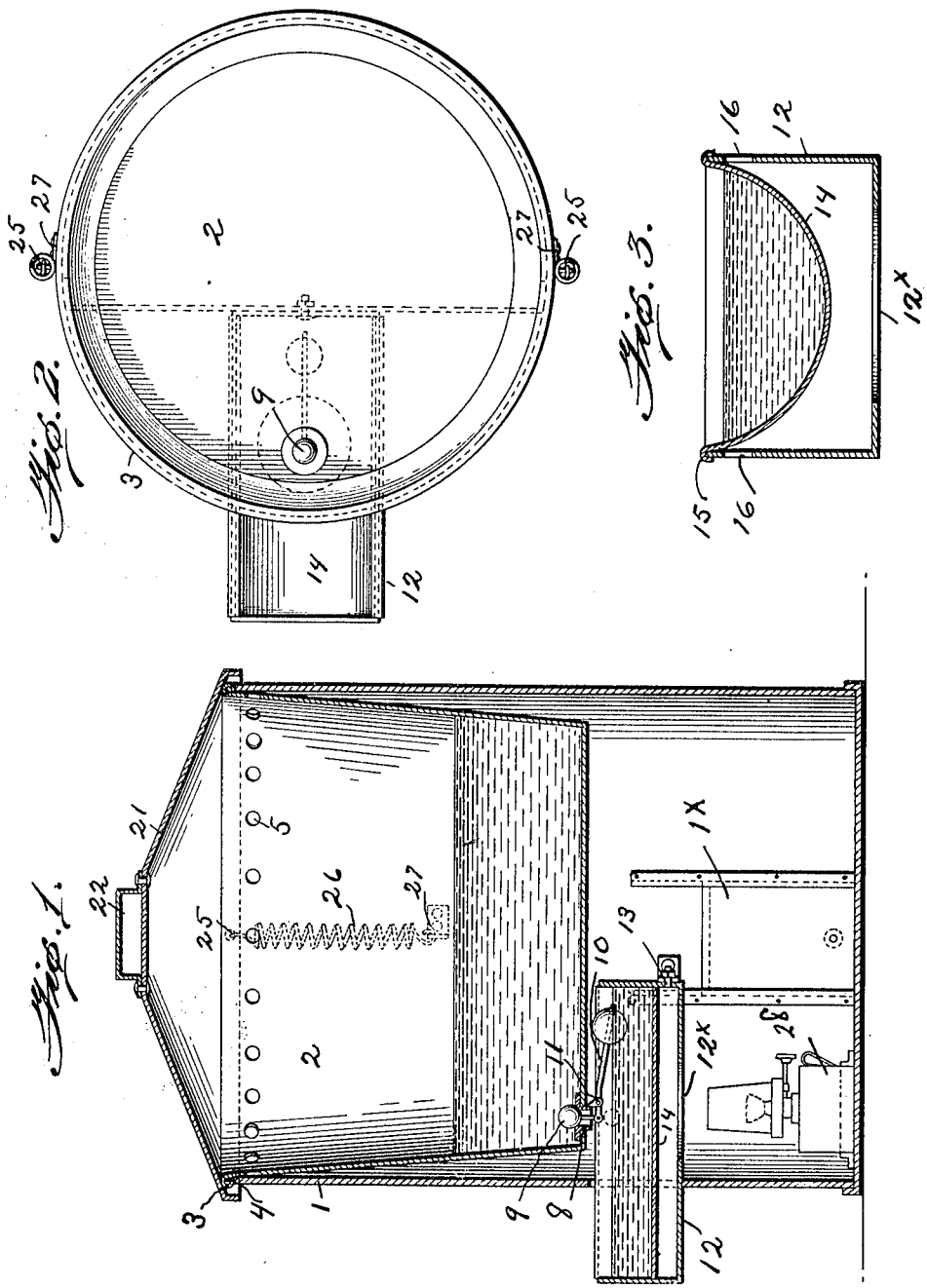

UNITED STATES PATENT OFFICE.

JOSEPH H. WICKSTROM, OF BERESFORD, SOUTH DAKOTA.

HOG-FOUNTAIN.

1,317,148.  Specification of Letters Patent. Patented Sept. 23, 1919.

Application filed January 21, 1919. Serial No. 272,258.

*To all whom it may concern:*

Be it known that I, JOSEPH H. WICK-STROM, a citizen of the United States, residing at Beresford, in the county of Union and State of South Dakota, have invented certain new and useful Improvements in Hog-Fountains; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in watering or fountain troughs for live stock and consists essentially in the provision of a device of this nature so arranged that the water may be automatically fed to the trough in small quantities, means being provided to prevent the same from freezing.

More specifically, the invention consists in the provision of a fountain watering trough having an outer casing with a tank suspended therein, and having float regulated valve exit openings, permitting water to run in the trough, and the provision of a cover held upon the receptacle by spring connections intermediate the same and the casing.

The invention consists of further details of construction, combination and arrangement of parts which will be hereinafter fully described, shown in the accompanying drawings, and then specifically defined in the appended claim.

I illustrate my invention in the accompanying drawings which, with the letters of reference marked thereon, form a part of this application, and in which:

Figure 1 is a central vertical sectional view through the apparatus.

Fig. 2 is a plan view with the top removed, and

Fig. 3 is a sectional view transversely through the trough.

Reference now being had to the details of the drawings by numerals:

1 designates the casing which is preferably of cylindrical shape, and 2 is a water receptacle of tapering shape and having a ring 4 at its upper marginal edge, about which a beading 3 is formed by turning the top of the receptacle about said ring, and which beading is adapted to rest upon the top of the receptacle 1. The receptacle 2 is provided with a series of perforations 5 through which heat may pass from the interior of the casing 1 into the interior of the receptacle 2. Said casing is provided with an opening regulated by a door 1$^x$ and through which a lamp 28 may be inserted to be placed underneath the trough 12 which is inserted through an opening in the casing, with a portion projecting therefrom, as shown in Fig. 1 of the drawings. Said trough has an opening 12$^x$ in the bottom thereof to permit heat to pass from the lamp into the space intermediate the bottom 12 and the convexed bottom 14 of the receptacle containing water. Said bottom 14 has its ends bent to form hooks 15, shown in Fig. 3 of the drawings, which engage over the upper edges of the side walls of the trough 12, the latter being provided with heat exit openings 16. The receptacle 2 is provided with an exit opening 8 regulated by a ball valve 9, and 10 is a lever pivotally connected at 11 to the valve 9, and has a float adapted to rest upon the water within the trough.

A suitable closure 21 fits over the top of the casing 1 and has a handle 22, and at points diametrically opposite are lugs 25. Coiled springs 26 are connected one to each lug 25 and their lower ends connected to the brackets 27 fastened to the outer surface of the receptacle 1 and which serve as means for holding the closure in place, the springs being adapted to yield when the closure is raised to uncover the receptacle.

In operation, it will be noted that the float actuated valve will regulate the supply of water permitted to run into the trough, and through the medium of the lamp the contents of the trough may be kept from freezing, the heat from the walls of the casing of the trough being permitted to make exit and prevent the valve in the bottom of the water tank from freezing.

What I claim to be new is:

A fountain watering trough, comprising a cylindrical casing with an opening in the circumferential wall thereof, a trough supported in said opening, a reservoir having a tapering wall, the upper end of which is bent to form a hooked flange engaging over the top of the casing, the lower portion of the reservoir positioned adjacent to the top of said trough, and a space intermediate the circumference of the reservoir and the casing, which reduces in size toward the top of the latter, said reservoir having a series of apertures near its top and opening into said space, a heater below the reservoir, a cover having an inclined portion resting upon the hooked flange of the reservoir and provided with a peripheral flange, the lower edge of which is positioned in a plane above said aperture in the reservoir.

In testimony whereof I hereunto affix my signature in presence of two witnesses.

JOSEPH H. WICKSTROM.

Witnesses:
A. A. SODERSTROM,
A. R. OLSON.

Copies of this patent may be obtained for five cents each, by addressing the "Commissioner of Patents, Washington, D. C."